US007799417B2

(12) United States Patent
Komiyama et al.

(10) Patent No.: US 7,799,417 B2
(45) Date of Patent: Sep. 21, 2010

(54) SI-SIC BASED FIRED BODY AND METHOD FOR MANUFACTURING THE SAME

(75) Inventors: Tsuneo Komiyama, Toki (JP); Osamu Yamakawa, Kani-Gun (JP); Seiichi Hori, Kani-Gun (JP)

(73) Assignees: NGK Insulators, Ltd., Nagoya (JP); NGK Adrec Co., Ltd., Kani-Gun (JP)

( * ) Notice: Subject to any disclaimer, the term of this patent is extended or adjusted under 35 U.S.C. 154(b) by 368 days.

(21) Appl. No.: 11/863,873

(22) Filed: Sep. 28, 2007

(65) Prior Publication Data

US 2008/0254271 A1   Oct. 16, 2008

(30) Foreign Application Priority Data

Oct. 11, 2006   (JP)   ............... 2006-277239

(51) Int. Cl.
*B32B 3/06* (2006.01)
*C04B 35/64* (2006.01)

(52) U.S. Cl. ............... 428/307.3; 428/307.7; 428/314.2; 428/316.6; 428/220; 428/698; 428/446; 264/666; 264/653; 264/682

(58) Field of Classification Search ............... None
See application file for complete search history.

(56) References Cited

U.S. PATENT DOCUMENTS

| 5,840,436 | A | 11/1998 | Hanzawa et al. |
| 7,128,963 | B2* | 10/2006 | Benitsch ............ 428/212 |
| 2004/0197542 | A1* | 10/2004 | Benitsch ............ 428/304.4 |

FOREIGN PATENT DOCUMENTS

| JP | 62-036087 A1 | 2/1987 |
| JP | 2535480 B2 | 6/1996 |
| JP | 2758313 B2 | 3/1998 |
| JP | 3137737 B2 | 12/2000 |
| JP | 2006-151719 A1 | 6/2006 |

* cited by examiner

*Primary Examiner*—Ling Xu
(74) *Attorney, Agent, or Firm*—Burr & Brown

(57) ABSTRACT

A Si—SiC based fired body includes a plurality of silicon carbide (SiC) particles serving as an aggregate, and silicon (Si) which serves as a binder and which is filled into gaps between the above-described silicon carbide particles, wherein the maximum particle diameter of the above-described silicon carbide particles is 0.5 mm or more, the content of silicon is 5 to 40 percent by mass, and the porosity is 0 to 5%. Preferably, the Si—SiC based fired body is in a thick-walled shape having a thickness of 20 to 200 mm.

8 Claims, 1 Drawing Sheet

SI-SIC BASED FIRED BODY AND METHOD FOR MANUFACTURING THE SAME

BACKGROUND OF THE INVENTION

1. Field of the Invention

The present invention relates to an Si—SiC based fired body and a method for manufacturing the same. More particularly, it relates to an Si—SiC based fired body that is resistant to oxidation degradation, breakage, and the like even when a thick-walled shape is taken and a method for manufacturing the same.

2. Description of the Related Art

Heretofore, silicon carbide (SiC) based fired bodies have held an industrially important position because of their excellent heat resistance and fire resistance, and have been used frequently as, for example, shelf boards for firing ceramics such as insulators, sanitary earthenware, tableware, frame, and pottery tubes, and tiles. Among these SiC based fired bodies, Si—SiC based fired bodies containing SiC and Si as constituent components have been primarily used as furnace tubes for firing semiconductors, tubes for roller heat exchangers of roller hearth kilns, shelf boards for firing ceramic products, and the like (for example, refer to Japanese Patent No. 2758313, Japanese Patent No. 2535480, and Japanese Patent No. 3137737).

There is a problem in that when thicknesses of these Si—SiC based fired bodies are increased, strength and oxidation resistance cannot be maintained. The Si—SiC based fired body is produced by impregnating a porous SiC fired body with metal silicon (Si). When the SiC fired body takes a thick-walled shape having a thickness of 20 mm or more, metal Si is not easy to impregnate therein, and therefore many pores not filled with metal Si remain in the Si—SiC based fired body. In this case, there are cracking problems that occur during the production and accordingly, the strength decreases significantly due to pores. Furthermore, when an Si—SiC based fired body having many remaining pores is used under a high temperature, there is a problem in that oxidation degradation proceeds from portions of pores, the strength decreases, and snap, breakage, and the like may occur.

Heat-resistant materials other than the Si—SiC based fired bodies, such as oxide-bonded SiC materials, silicon nitride-bonded SiC materials, and alumina-mullite materials, can take thick-walled shapes. However, under an environment in which a large temperature difference occurs, there is a problem in that a thermal stress, which causes destruction, is generated due to the temperature difference, since the thermal conductivity is low. When an increase and a decrease in temperature are repeated during use, a stress due to repetition is generated and, thereby, damage or destruction occurs due to cyclic fatigue. Furthermore, there is a problem in that damage due to mechanical stress can occur easily since the strength of the bonding structure is low and a life span becomes short since the abrasion resistance and the like are low.

Monolithic refractories are notable for good workability, low cost, and the like. However, as in the case of the above-described oxide-bonded SiC materials, there are problems in that breakage can occur at an early stage of use due to the shortage of strength of the bonding structure and damage can occur due to the thermal stress resulting from a temperature difference inside the monolithic refractory.

SUMMARY OF THE INVENTION

The present invention has been made in consideration of such problems in known technology, and is characterized in that it provides an Si—SiC based fired body which is resistant to oxidation degradation, breakage, and the like even when a thick-walled shape is taken, and a method for manufacturing the same is applied.

The present invention provides the following Si—SiC based fired body and a method for manufacturing the same.

An Si—SiC based fired body includes a plurality of silicon carbide (SiC) particles serving as an aggregate and silicon (Si) filled in gaps between the above-described silicon carbide particles, wherein the maximum particle diameter of the silicon carbide particles is 0.5 mm or more, the content of the silicon is 5 to 40 percent by mass, and the porosity is 0 to 5%.

Preferably, the Si—SiC based fired body takes a thick-walled shape having a thickness of 20 to 200 mm.

In the Si—SiC based fired body, the content of the above-described silicon carbide particles having particle diameters of 0.5 mm or more is preferably 10 to 80 percent by mass in the entire silicon carbide particles.

The Si—SiC based fired body may be used as a rotary kiln lifter disposed on an inner surface of a shell of a rotary kiln.

A method for manufacturing an Si—SiC based fired body includes the steps of preparing a pug containing silicon carbide particles having a maximum particle diameter of 0.5 mm or more, forming the pug into a formed body, heating the formed body to 1,000° C. or higher in an inert gas atmosphere at a pressure of 100 hPa or less to obtain a primary fired body, and heating the primary fired body in contact with silicon to 1,400° C. or higher in an inert gas atmosphere to obtain an Si—SiC based fired body.

The above-described step for obtaining the primary fired body may be a step where the above-described formed body is heated in an inert gas atmosphere at a pressure of 100 hPa or less at 1,000° C. or higher for 2 to 30 hours.

The above-described step for obtaining the primary fired body may also be a step where the above-described formed body is heated to 1,000° C. or higher and below 1,400° C. in the presence of silicon in an inert gas atmosphere at a pressure of 100 hPa or less, and the above-described step for obtaining the Si—SiC based fired body may be a step in which the temperature is raised continuously from the step for producing the primary fired body and the primary fired body in contact with silicon is heated to 1,400° C. or higher in an inert gas atmosphere.

The bulk density of the above-described formed body is preferably 1.65 to 2.7 g/cm$^3$.

According to the Si—SiC based fired body of the present invention, the maximum particle diameter of the silicon carbide particles is 0.5 mm or more, the content of silicon (Si) is 5 to 40 percent by mass, and the porosity is 0 to 5%. Therefore, oxidation degradation, breakage, and the like do not easily occur.

According to the method for manufacturing an Si—SiC based fired body of the present invention, the Si—SiC based fired body is obtained by heating the formed body containing predetermined silicon carbide particles to 1,000° C. or higher in an inert gas atmosphere at a pressure of 100 hPa or less to obtain the primary fired body, and thereafter, heating the resulting primary fired body in contact with silicon to 1,400° C. or higher in an inert gas atmosphere. Therefore, it becomes possible to decompose SiO$_2$ in the step for obtaining the primary fired body, because while SiO$_2$ is present on the surfaces of the silicon carbide particles and it acts as an impregnation hindering substance with the metal Si, and its decomposition thereby conducts adequate and improved impregnation with metal Si in the following step of obtaining the Si—SiC based fired body.

DETAILED DESCRIPTION OF THE INVENTION

Figure 1:
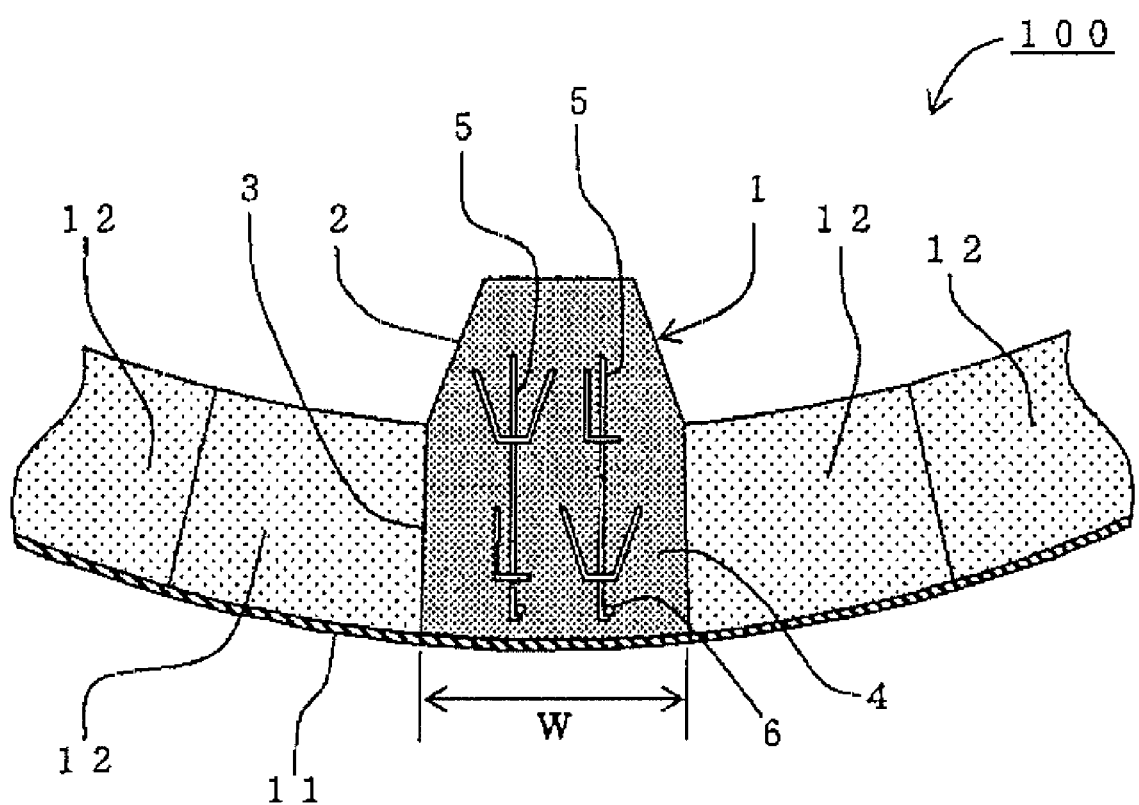
FIG. 1 illustrates a rotary kiln provided with a rotary kiln lifter using an Si—SiC based fired body of the present invention, and is a partially sectional view perpendicular to a central axis (a rotation axis).

The preferred embodiments for carrying out the present invention will be specifically described below. However, the present invention is not limited to the following embodiments. It should be understood that modifications of designs, improvements, and the like could be made appropriately on the basis of the common knowledge by one skilled in the art without departing from the spirit or scope of the present invention.

An Si—SiC based fired body according to an embodiment of the present invention includes a plurality of silicon carbide (SiC) particles serving as an aggregate and silicon (metal silicon, Si) filled in gaps between the silicon carbide particles, wherein the maximum particle diameter of the silicon carbide particles is 0.5 mm or more, the content of silicon is 5 to 40 percent by mass, and the porosity is 0 to 5%.

In the Si—SiC based fired body and the method for manufacturing an Si—SiC based fired body according to the aspects of the present invention, the particle diameters of silicon carbide particles are values measured with sieves. Raw material particles are sieved, and the particle diameter can be measured on the basis of whether the particles pass sieves or not. The porosity of the Si—SiC based fired body is a value measured by an Archimedes' method and indicates a value of apparent porosity determined on the basis of "JIS R 2205 Testing method for apparent porosity, water absorption specific gravity of refractory bricks".

In the Si—SiC based fired body of the present embodiment, the maximum particle diameter of the silicon carbide particles serving as an aggregate is 0.5 mm or more, preferably 0.5 to 6 mm, more preferably 1 to 5 mm, and particularly preferably 1 to 3 mm. As described above, since the maximum particle diameter of the silicon carbide particles is 0.5 mm or more which is relatively large, silicon (Si) is adequately filled in gaps between silicon carbide particles, and therefore the Si—SiC based fired body having a small porosity is formed. When the maximum particle diameter of the silicon carbide particles is below 0.5 mm, silicon (Si) is not adequately filled in gaps between silicon carbide particles, and there are problems such as an occurrence of cracking and oxidation degradation during firing. Furthermore, it is desirable that the particle diameters of the silicon carbide particles to be used are up to 6 mm. When the proportion of silicon carbide particles having particle diameters exceeding 5 mm increases, there may occur a problem in that occurrence of breakage in SiC particles causes the strength decrease when an Si—SiC based fired body is produced. As described above, the Si—SiC based fired body can take a thick-walled shape when silicon (Si) can be adequately filled into gaps between silicon carbide particles.

In the Si—SiC based fired body of the present embodiment, preferably, the content of the silicon carbide particles having the particle diameter of 0.5 mm or more is 10 to 80 percent by mass in the entire silicon carbide particles serving as an aggregate, and more preferably 30 to 60 percent by mass. Since the content of the silicon carbide particles having the particle diameter of 0.5 mm or more is within the above-described range, silicon (Si) is filled in gaps between the silicon carbide particles adequately throughout the entire Si—SiC based fired body. Therefore, an Si—SiC based fired body having a smaller porosity can be produced. Consequently, the Si—SiC based fired body having excellent strength and oxidation resistance is produced.

The Si—SiC based fired body of the present embodiment has a porosity of 0 to 5%, and more preferably 0 to 1%. Since, as described above, the porosity is 0 to 5%, which is relatively small, oxidation degradation and the like do not easily occur. When the porosity exceeds 5%, it is unfavorable because problems such as strength reduction and oxidation degradation occur, while the corrosion resistance and the like deteriorate, and therefore the life span expectancy decreases.

In the Si—SiC based fired body of the present embodiment, silicon serves as a binder. The content of silicon is 5 to 40 percent by mass, and more preferably 10 to 30 percent by mass. When the silicon content is below 5 percent by mass, the porosity increases due to gap portions remained in SiC, and therefore problems such as strength reduction and oxidation degradation occur. In the case where the formed body before impregnation with silicon has few gaps, flow paths for impregnation with silicon become smaller, and impregnation with silicon becomes inadequate. As a result, problems such as cracking during firing unfavorably occur. When the silicon content exceeds 40 percent by mass, the amount of impregnation with silicon becomes excessive. Therefore, problems such as cracking during firing and strength reduction occur.

Preferably, the Si—SiC based fired body of the present embodiment takes a thick-walled shape having a thickness of 20 to 200 mm, and more preferably takes a thick-walled shape having a thickness of 30 to 50 mm. The Si—SiC based fired body in the thick-walled shape having a thickness of 20 to 200 mm exhibits excellent strength, and can be used as a member such as a lifter for a rotary kiln, which requires both characteristics of strength and heat resistance. Here, the term "a thick-walled shape" refers to a tabular shape, a cubic shape, a pipe or beam shape, or the like having a large thickness of 20 mm or more. Therefore, the term "a thick-walled shape having a thickness of 20 to 200 mm" refers to a shape having a large thickness.

An embodiment of a method for manufacturing an Si—SiC based fired body of the present invention will be described below.

The method for manufacturing an Si—SiC based fired body of the present embodiment includes the steps of preparing a pug containing silicon carbide particles having a maximum particle diameter of 0.5 mm or more, forming the resulting pug into a formed body, heating the resulting formed body to 1,000° C. or higher in an inert gas atmosphere at a pressure of 100 hPa or less to obtain a primary fired body, and heating the resulting primary fired body in contact with silicon to 1,400° C. or higher in an inert gas atmosphere to obtain an Si—SiC based fired body.

As described above, the Si—SiC based fired body is obtained by heating the formed body containing predetermined silicon carbide particles to 1,000° C. or higher in an inert gas atmosphere at a pressure of 100 hPa or less to obtain the primary fired body, and thereafter, heating the resulting primary fired body in contact with silicon to 1,400° C. or higher in an inert gas atmosphere. Therefore, it becomes possible to decompose $SiO_2$ in the step for obtaining the primary fired body, while $SiO_2$ is present on the surfaces of the silicon carbide particles and acts as an impregnation hindering substance with metal Si, and therefore conducts impregnation with metal Si adequately in the following step of obtaining the Si—SiC based fired body. According to this manufacturing method, even a primary fired body having a large thickness can be adequately impregnated with metal Si.

Consequently, an Si—SiC based fired body in a thick-walled shape exhibiting excellent strength and excellent oxidation resistance can be obtained.

The method for manufacturing an Si—SiC based fired body of the present embodiment includes the step of preparing the pug containing silicon carbide particles having a maximum particle diameter of 0.5 mm or more. In the step of preparing the pug, silicon carbide particles having a maximum particle diameter of 0.5 mm or more are blended with a dispersion medium such as water, as an additive. Furthermore, an organic binder and a dispersant are added, followed by kneading, so as to form a clay-like pug. At this time, it is also effective to add a pore former, if necessary.

The maximum particle diameter of the silicon carbide particles to be used in the method for manufacturing an Si—SiC based fired body of the present embodiment is 0.5 mm or more, preferably 0.5 to 6 mm, more preferably 1 to 5 mm, and particularly preferably 1 to 3 mm. As described above, the maximum particle diameter of the silicon carbide particles is 0.5 mm or more which is relatively large, and therefore, silicon (Si) can be adequately filled into gaps between silicon carbide particles (impregnation) in production of the Si—SiC based fired body. When the maximum particle diameter of the silicon carbide particles is below 0.5 mm, silicon (Si) is not adequately filled into gaps between silicon carbide particles, and problems, e.g., oxidation degradation, occur. Furthermore, it is preferable that the proportion of the silicon carbide particles having particle diameters exceeding 5 mm be small, preferably 5 percent by mass or less, and more preferably 1 percent by mass or less. When the proportion of silicon carbide particles having particle diameters exceeding 5 mm increases, a problem may occur in that breakage in SiC particles causes the strength to decrease when the Si—SiC based fired body is produced. As described above, the Si—SiC based fired body can take a thick-walled shape since silicon (Si) can be adequately filled (impregnated) into gaps between silicon carbide particles.

With respect to the silicon carbide particles to be used in the method for manufacturing an Si—SiC based fired body of the present embodiment, it is preferable that the content of the silicon carbide particles having the particle diameter of 0.5 mm or more is 10 to 80 percent by mass of the entire silicon carbide particles, and more preferably 30 to 60 percent by mass. Since the content of the silicon carbide particles having the particle diameter of 0.5 mm or more is within the above-described range, silicon (Si) is filled (impregnated) into gaps between the silicon carbide particles more than adequately in the production of the Si—SiC based fired body. Consequently, the Si—SiC based fired body having excellent strength and oxidation resistance can be produced.

Preferably, the average particle diameter of the silicon carbide particles is 0.2 to 2 mm, and further preferably 0.2 to 1 mm. The average particle diameter is a value determined by putting a raw material powder through a plurality of sieves having different sieve openings, and measuring the weight of the powder remaining on each sieve.

The pore former to be used as needed in the method for manufacturing an Si—SiC based fired body of the present embodiment favorably has a property of scattering and disappearing during the firing step or remains after being carbonized, while inorganic materials such as coke, polymer compounds such as a resin foam, organic materials such as starch, and the like may be used. These may be used alone or in combination of two or more kinds. Also, the content of the pore former is preferably 10 percent by volume or less relative to the entire pug. The pore former may also be used as an organic binder.

For the organic binder, methyl cellulose, lignin sulfonate, polyethylene glycol, polyacrylic ester, carboxymethyl cellulose, polyvinyl alcohol, and the like may be used. These may be used alone or in combination of two or more kinds. Also, the content of the organic binder is preferably 0.05 to 5.0 percent by mass relative to the entire pug, and more preferably 0.1 to 2.0 percent by mass.

For the dispersant, sodium polycarboxylate, naphthalenesulfonic acid, polyethyleneimine, sodium polyacrylate, sodium silicate, ethylene glycol, dextrin, fatty acid soap, polyalcohol, and the like may be used. These may also be used alone or in combination of two or more kinds. Also, the content of the dispersant is preferably 0.01 to 2.0 percent by mass relative to the entire pug, and more preferably 0.05 to 0.5 percent by mass.

Examples of dispersants may include water, and in the case of rammer molding, vibrating press, or oil hydraulic press, the content of the dispersant is preferably 1 to 10 percent by mass relative to the entire pug, and more preferably 3 to 7 percent by mass. When the content is too small, the pug may become stiff and difficult to form. When the content is too large, the body may then become too soft. In the case of cast molding, it is preferable that the content be 10 to 30 percent by mass. However, this value is no more than a reference, it is preferable that the amount of the dispersant should be adjusted in such a way that the viscosity of the slurry to be produced becomes 5 to 50 centipoise.

The method for preparing the pug by kneading the above-described silicon carbide particles and other additives is not specifically limited. Examples of the method include methods using Fret, Simpson mixer, KANTO Mixer, a trommel, a kneader, a vacuum pug mill, and the like.

Subsequently, the method for manufacturing an Si—SiC based fired body of the present embodiment includes a step of forming the resulting pug into a formed body. The method for forming the formed body is not specifically limited, and heretofore known forming methods such as rammer molding, press molding, and cast molding may be used.

It is preferable that the formed body take a thick-walled shape. The thickness of the thick-walled shape is preferably 20 to 200 mm, and more preferably 30 to 50 mm. By forming the shape of the formed body into a thick-walled shape, as described above, the resulting Si—SiC based fired body after firing can also take a thick-walled shape. Furthermore, specific examples of shapes include a cube, a rectangular parallelepiped, a cylinder, a prism, a truncated cone, a truncated pyramid, a hollow shape, and other shapes in which the shapes of the faces of the above-described shapes are modified.

Preferably, the resulting formed body has a bulk density of 1.65 to 2.7 $g/cm^3$. When the bulk density is too thin, pores, which are the gaps between silicon carbide particles when the primary fired body is formed, become excessive (the porosity becomes too high) and, thereby, the strength of the resulting Si—SiC based fired body decreases. When the bulk density is too high, the pores are too few and the porosity becomes too low, when the primary fired body is formed. Therefore, when the primary fired body is impregnated with metal silicon, the amount of impregnation of the metal silicon will not be adequate for firmly bonding the silicon carbide particles.

Subsequently, the method for manufacturing an Si—SiC based fired body of the present embodiment includes a step of heating the resulting formed body to 1,000° C. or higher in an inert gas atmosphere at a pressure of 100 hPa or less to obtain a primary fired body.

As described above, since the formed body is heated to 1,000° C. or higher in an inert gas atmosphere at a pressure of 100 hPa or less, silicon dioxide ($SiO_2$) present on the surfaces of the silicon carbide particles constituting the formed body are converted to SiO, through thermal decomposition or a reduction reaction, and then evaporate. Accordingly, a part of silicon dioxide may evaporate and not be converted to SiO. The silicon dioxide present on the surfaces of the silicon carbide particles will exhibit poor wettability with metal silicon (Si). Therefore, when silicon dioxide is present on the surfaces of the silicon carbide particles, there is a problem in that impregnation with silicon is not easily performed during the following step of impregnating the silicon carbide particles with silicon. However, removing silicon dioxide in advance, as described above, enables the primary fired body to be easily impregnated with silicon. And since it becomes possible to easily impregnate the silicon carbide particles with silicon, even in the case where the formed body is formed to have a thick-walled shape and the resulting primary fired body takes a thick-walled shape, impregnation with silicon can be performed adequately. Consequently, the Si—SiC based fired body exhibiting excellent strength and excellent oxidation resistance can be obtained.

The heating apparatus to be used is not specifically limited insofar as the apparatus can be decompressed to 100 hPa or less, and heat to 1,000° C. or higher, and a combustion furnace, an electric furnace, or the like may be used.

The pressure in the heating apparatus is 100 hPa or less, preferably 0.1 to 50 hPa, and more preferably 1 to 10 hPa. When the pressure is too high, thermal decomposition occurs that reduces the reaction of silicon dioxide and is not easily processed. As a result, the silicon dioxide generated on the SiC surface is not completely removed, and remains. Consequently, a problem occurs in that the impregnation with metal silicon cannot be performed.

The heating time is preferably 2 hours or more, and more preferably 2 to 30 hours. When the heating time is below 2 hours, silicon dioxide may not thermally decompose adequately. Furthermore, the generated SiO may not be adequately vaporized and removed completely to the outside of the system.

The heating temperature is 1,000° C. or higher, preferably 1,000° C. to 1,500° C., further preferably 1,100° C. to 1,400° C., and particularly preferably 1,200° C. to 1,300° C. When the heating temperature is unfavorably below 1,000° C., the silicon dioxide is difficult to thermally decompose.

The inert gas is not specifically limited. Examples thereof include a helium gas, a neon gas, an argon gas, a krypton gas, and a xenon gas. The argon gas is preferable.

Subsequently, the method for manufacturing an Si—SiC based fired body of the present embodiment includes a step of heating the resulting primary fired body in contact with silicon to 1,400° C. or higher in an inert gas atmosphere to obtain an Si—SiC based fired body.

As described above, in the primary fired body, silicon dioxide present on the surfaces of the silicon carbide particles is thermally decomposed and removed. Therefore, the wettability between the surfaces of the silicon carbide particles and metal silicon is good. Pores in the primary fired body can then be adequately impregnated with metal silicon by heating the primary fired body in contact with silicon to 1,400° C. or higher in an inert gas atmosphere. Consequently, the Si—SiC based fired body exhibiting excellent strength and excellent oxidation resistance can be obtained.

The heating apparatus to be used is not specifically limited insofar as the apparatus can heat to 1,400° C. or higher, and a combustion furnace, an electric furnace, or the like may be used.

The pressure in the heating apparatus is preferably 0.01 to 50 hPa, and more preferably 0.1 to 10 hPa.

The maximum temperature to be reached by heating is 1,400° C. or higher, preferably 1,400° C. to 1,800° C., and particularly preferably 1,450° C. to 1,600° C. When the temperature is below 1,400° C., silicon unfavorably does not melt.

Preferably, the time of keeping the maximum temperature is 1 to 10 hours, and more preferably 3 to 5 hours. When the time is too short, the primary fired body may not be adequately impregnated with silicon.

The inert gas is not specifically limited. Examples thereof include a helium gas, a neon gas, an argon gas, a krypton gas, and a xenon gas, with the argon gas being preferable.

The above-described step of producing a primary fired body and the step of producing an Si—SiC based fired body may be conducted continuously or be conducted separately by, for example, lowering the temperature of the primary fired body once. In the case where these steps are to be conducted continuously, it is preferable that silicon be put into the heating apparatus in advance of the step of obtaining a primary fired body, and after the primary fired body is obtained by the above-described method, the temperature in the heating apparatus is then raised continuously from the state just after the primary fired body is produced. And it is also preferable that the primary fired body in contact with the silicon is heated to 1,400° C. or higher in an inert gas atmosphere to obtain the Si—SiC based fired body. At this time, in the step of producing the primary fired body, the heating temperature is preferably 1,000° C. or higher, and below 1,400° C. When the heating temperature is 1,400° C. or higher, silicon begins to melt and the primary fired body begins to be impregnated with silicon. Consequently, silicon dioxide on the surfaces of the silicon carbide particles may become difficult to remove. When silicon is put into the heating apparatus in advance in the step of obtaining a primary fired body, silicon may or may not be in contact with the fired body (formed body). However, it is preferable that the silicon be placed in contact with the primary fired body (formed body) in advance to improve the operational efficiency because the following steps are conducted continuously.

The Si—SiC based fired body of the present invention obtained by the above-described method for manufacturing an Si—SiC based fired body exhibits excellent strength and oxidation resistance even when a thick-walled (thickness of 20 to 200 mm) shape is taken.

As described above, the Si—SiC based fired body of the present invention exhibits excellent strength and oxidation resistance even when a thick-walled (thickness of 20 to 200 mm) shape is taken. Therefore, the Si—SiC based fired body may be used as a rotary kiln lifter disposed on an inner surface of a shell of a rotary kiln. In addition, it is possible to be used for a variety of purposes in which thick-walled shapes are required.

FIG. 1 illustrates a rotary kiln provided with a rotary kiln lifter using the Si—SiC based fired body of the present invention, and is a partially sectional view perpendicular to a central axis (a rotation axis) of the rotary kiln.

The rotary kiln to be provided with a rotary kiln lifter using the Si—SiC based fired body of the present invention is not specifically limited, and heretofore known rotary kilns may be used. For example, as illustrated in FIG. 1, a rotary kiln lifter 1 using the Si—SiC based fired body of the present invention includes a base end portion 3 and a front end portion 2. The lifter 1 is disposed in the rotary kiln 100 in such a way that the base end portion 3 is embedded in a refractory wall 12 lining an inner surface of a shell 11 of a rotary kiln 100 and the front end portion 2 is protruded inward from the refractory wall 12. The rotary kiln lifter 1 includes an Si—SiC based fired body 4 and anchors 5 embedded in the Si—SiC based fired body 4. And the anchors 5 are fixed to the inner surface of the shell 11 with the anchor-fixing member 6 and, thereby, the rotary kiln lifter 1 is fixed to the rotary kiln 100.

In the case of the rotary kiln lifter 1 illustrated in FIG. 1, When the length (the width in a horizontal direction in the drawing) W in an outer perimeter direction of the rotary kiln 100 is short, breakage occurs easily. However, the rotary kiln lifter 1 by using the Si—SiC based fired body of the present invention is able to have a large thickness (thickness of 20 to 200 mm). Therefore, it is possible to increase the width W so as to prevent an occurrence of breakage. Incidentally, the length of the rotary kiln lifter 1 in the central axis direction of the rotary kiln 100 may be determined appropriately in consideration of the agitation efficiency and the like of the rotary kiln, and is usually made longer than the width W. For example, the length is preferably about 100 to 700 mm.

The constituents, other than the rotary kiln lifter 1, constituting the rotary kiln 100 are not specifically limited, and known constituents may be used.

EXAMPLES

The present invention will be further specifically described below with reference to examples. However, the present invention is not limited to these examples.

Pug

Pug A

A Pug (Pug A) was prepared by mixing 94.3 percent by mass of silicon carbide, 0.7 percent by mass of binder, and 5 percent by mass of water and conducting kneading with a fret mixer. A mixture of lignin sulfonate and carboxymethyl cellulose at a mass ratio of 3:7 was used as the binder. Silicon carbide composed of 40 percent by mass of silicon carbide particles having particle diameters of 0.5 mm or more and 60 percent by mass of silicon carbide particles having particle diameters of below 0.5 mm was used. With respect to the particle size distribution of silicon carbide particles having particle diameters of 0.5 mm or more, 0.7 percent by mass of silicon carbide particles had particle diameters of more than 5 mm, 51.2 percent by mass of silicon carbide particles had particle diameters of 2 to 5 mm, 27.3 percent by mass of silicon carbide particles had particle diameters of 1 mm or more and below 2 mm, and 20.8 percent by mass of silicon carbide particles had particle diameters of 0.5 mm or more and below 1 mm. With respect to the particle size distribution of silicon carbide particles having particle diameters of below 0.5 mm, 23.6 percent by mass of silicon carbide particles had particle diameters of 0.25 mm or more and below 0.5 mm, 26.4 percent by mass of silicon carbide particles had particle diameters of 0.1 mm or more and below 0.25 mm, and 50.0 percent by mass of silicon carbide particles had particle diameters of below 0.1 mm.

Pug B1

Pug B1 was prepared as in Pug A except that the particle size distribution of silicon carbide particles was changed by mixing 92.6 percent by mass of silicon carbide, 0.7 percent by mass of binder, and 6.7 percent by mass of water. Silicon carbide composed of 8 percent by mass of silicon carbide particles having particle diameters of 0.5 mm or more and 92 percent by mass of silicon carbide particles having particle diameters of below 0.5 mm was used. With respect to the particle size distribution of silicon carbide particles having particle diameters of 0.5 mm or more, 0.8 percent by mass of silicon carbide particles had particle diameters of 2 mm or more, 43.5 percent by mass of silicon carbide particles had particle diameters of 1 mm or more and below 2 mm, 55.7 percent by mass of silicon carbide particles had particle diameters of 0.5 mm or more and below 1 mm. The particle size distribution of silicon carbide particles having particle diameters of below 0.5 mm was the same as that in the case of Pug A.

Pug B2

Pug B2 was prepared as in Pug A except that the particle size distribution of silicon carbide particles was changed by mixing 93.3 percent by mass of silicon carbide, 0.7 percent by mass of binder, and 6 percent by mass of water. Silicon carbide composed of 10 percent by mass of silicon carbide particles having particle diameters of 0.5 mm or more and 90 percent by mass of silicon carbide particles having particle diameters of below 0.5 mm was used. The particle size distribution of silicon carbide particles having particle diameters of 0.5 mm or more was the same as that in the case of Pug B1. The particle size distribution of silicon carbide particles having particle diameters of below 0.5 mm was the same as that in the case of Pug A.

Pug B3

Pug B3 was prepared as in Pug A except that the particle size distribution of silicon carbide particles was changed. Silicon carbide composed of 4.0 percent by mass of silicon carbide particles having particle diameters of 0.5 mm or more and 60 percent by mass of silicon carbide particles having particle diameters of below 0.5 mm was used. The particle size distribution of silicon carbide particles having particle diameters of 0.5 mm or more was the same as that in the case of Body B1. The particle size distribution of silicon carbide particles having particle diameters of below 0.5 mm was the same as that in the case of Pug A.

Pug B4

Pug B4 was prepared as in Pug A except that the particle size distribution of silicon carbide particles was changed by mixing 95.8 percent by mass of silicon carbide, 0.7 percent by mass of binder, and 3.5 percent by mass of water. Silicon carbide composed of 80 percent by mass of silicon carbide particles having particle diameters of 0.5 mm or more and 20 percent by mass of silicon carbide particles having particle diameters of below 0.5 mm was used. The particle size distribution of silicon carbide particles having particle diameters of 0.5 mm or more was the same as that in the case of Pug 81. The particle size distribution of silicon carbide particles having particle diameters of below 0.5 mm was the same as that in the case of Pug A.

Pug B5

Pug B5 was prepared as in Pug A except that the particle size distribution of silicon carbide particles was changed by mixing 96.3 percent by mass of silicon carbide, 0.7 percent by mass of binder, and 3 percent by mass of water. Silicon carbide composed of 85 percent by mass of silicon carbide particles having particle diameters of 0.5 mm or more and 15 percent by mass of silicon carbide particles having particle diameters of below 0.5 mm was used. The particle size distribution of silicon carbide particles having particle diameters of 0.5 mm or more was the same as that in the case of Body B1. The particle size distribution of silicon carbide particles having particle diameters of below 0.5 mm was the same as that in the case of Pug A.

Pug C

Pug C was prepared as in Pug A except that the particle size distribution of silicon carbide particles was changed by mixing 89.3 percent by mass of silicon carbide, 5 percent by mass of carbon powder having particle diameters of below 30 μm, 0.7 percent by mass of binder, and 5 percent by mass of water. Silicon carbide composed of 55 percent by mass of silicon carbide particles having particle diameters of 0.5 mm or more and 45 percent by mass of silicon carbide particles having particle diameters of below 0.5 mm was used. The particle size distribution of silicon carbide particles having particle diameters of 0.5 mm or more was the same as that in the case of Pug B1. The particle size distribution of silicon carbide particles having particle diameters of below 0.5 mm was the same as that in the case of Pug A.

Pug (Slurry) D

Pug (Slurry) D was prepared by mixing 79.8 percent by mass of silicon carbide, 0.1 percent by mass of polyvinyl alcohol (binder), 0.1 percent by mass of polyacrylic acid (dispersant), and 20 percent by mass of water with a pot mill. Silicon carbide composed of 40 percent by mass of silicon carbide particles having particle diameters of 0.5 mm or more and 60 percent by mass of silicon carbide particles having particle diameters of below 0.5 mm was used. The particle size distribution of silicon carbide particles having particle diameters of 0.5 mm or more was the same as that in the case of Pug B1. The particle size distribution of silicon carbide particles having particle diameters of below 0.5 mm was the same as that in the case of Pug A.

Pug E

Pug E was prepared as in Pug A except that the particle size distribution of silicon carbide particles was changed. A mixture composed of 50 percent by mass of silicon carbide particles having particle diameters of 0.005 mm to 0.02 mm and 50 percent by mass of silicon carbide particles having particle diameters of below 0.001 mm was used as silicon carbide.

Formed Body

The Pug produced by the above-described method was used. A formed body in a thick-walled tabular shape or tabular shape of 300 mm long×300 mm wide having a thickness (forming thickness (mm)) indicated in Table 1 and Table 2 was prepared by each forming method (rammer molding, vibrating press molding, cast molding, or oil hydraulic press molding) indicated in Table 1 and Table 2. The bulk density of each formed body is indicated in Table 1 and Table 2 (formed body bulk density: g/cm$^3$). The bulk density is a value measured by an Archimedes' method.

In the rammer molding, an apparatus which was swung by air was used, a head of 15×15 was mounted on a head portion, and each of the pugs produced under the respective conditions was rammed into a die with the rammer head to conduct forming. In the vibrating press molding, a vibrator was disposed on a die, vibration was provided to the die, and thereby the input pug was filled through vibration. In the cast molding, a gypsum mold was prepared by using gypsum produced by Noritake Co., Limited, and the slurry was poured into the gypsum mold to conduct forming. In the oil hydraulic press molding, forming was conducted in a uniaxial direction.

Primary Fired Body

Each resulting formed body was dried at 20° C. for 10 hours. Thereafter, each formed body was placed on a carbon jig, and was fired to obtain a primary fired body. With respect to the firing condition, the temperature was raised from ambient temperature to 1,000° C. over 5 hours in a nitrogen atmosphere at atmospheric pressure. Furthermore, the temperature was raised from 1,000° C. to 1,400° C. in an argon atmosphere at a predetermined pressure. The pressure during firing and the heating-up time from 1,000° C. to 1,400° C. of each formed body were the pressure and the heating-up time indicated in Table 1 and Table 2 (Firing condition from 1,000° C. to 1,400° C.).

Si—SiC Based Fired Body

Granular metal silicon having particle diameters of 1 mm to 10 mm was placed on and made into contact with the surface of each resulting primary fired body in an amount twice the required amount calculated from the density of a material to be fired. The temperature was raised from 1,400° C. to 1,600° C. over 3 hours in an argon atmosphere at 10 hPa, and firing was conducted at 1,600° C. for 5 hours, and therefore an Si—SiC based fired body was obtained (Examples 1 to 30 and Comparative examples 1 to 15). The required amount calculated from the density of a material to be fired refers to an amount of metal silicon that can enter pores and is calculated from the amount of the pores and the density of metal silicon, where a theoretical density, which assumed to be "a", of a mixture (material to be fired) is calculated from the true specific gravity and the blending ratio of each raw material in the mixture to be fired, the bulk density (g/cm$^3$), which is assumed to be "b", is calculated from the dimension and the mass of the material to be fired, and the amount of pores is calculated from the resulting a and b. Specifically, calculation is conducted on the basis of an equation:

$$\text{required amount of silicon (percent by mass)} = (a-b)/(a \times b) \times 2.3 \times 100$$

where 2.3 is a density of metal silicon to be used.

Apparent porosity (%), Si content (percent by mass), thermal conductivity (W/(m·K)), bending strength (MPa), and crack after firing of the resulting Si—SiC based fired body were evaluated by the following methods. The results are indicated as characteristics of fired body in Table 1 and Table 2.

Apparent Porosity

Apparent porosity was measured by the Archimedes' method on the basis of JIS R2205.

Si Content

Si content was measured by wet chemical analysis.

Thermal Conductivity

Thermal conductivity was measured by a laser flash method on the basis of JIS R1611.

Bending Strength

For bending strength, 4-point bending strength was measured on the basis of JIS R1601.

Crack After Firing

Crack after firing is the result of visual inspection or fluorescent penetrant inspection of crack occurred in the Si—SiC based fired body. The case where a crack having a length of 3 mm or more occurred was indicated by "x", and the case where no crack occurred or, if any, the length of crack was below 1 mm was indicated by "O".

TABLE 1

| | Type of pug | Forming method | Mixing & forming Amount of mixing SiC >0.5 mm (% by mass) | Bulk density of formed body (g/cm³) | Thickness of formed body (mm) | Condition for firing from 1000° C. to 1400° C. Pressure (hPa) | Heating-up time (Hrs.) | Characteristics of fired body Apparent porosity (%) | Si content % by mass | Thermal conductivity (W/(m·k)) | Bending strength (MPa) | Crack after firing |
|---|---|---|---|---|---|---|---|---|---|---|---|---|
| Exam. 1 | A | rammer | 40 | 2.62 | 100 | 2 | 10 | 0 | 14 | 177 | 106 | ○ |
| Exam. 2 | A | rammer | 40 | 2.59 | 100 | 2 | 10 | 0 | 14 | 175 | 110 | ○ |
| Exam. 3 | A | rammer | 40 | 2.20 | 100 | 2 | 10 | 0 | 25 | 158 | 120 | ○ |
| Exam. 4 | A | rammer | 40 | 1.93 | 100 | 2 | 10 | 0 | 32 | 143 | 106 | ○ |
| Exam. 5 | A | rammer | 40 | 1.81 | 100 | 2 | 10 | 0 | 36 | 125 | 118 | ○ |
| Exam. 6 | A | rammer | 40 | 1.67 | 100 | 2 | 10 | 0 | 40 | 103 | 102 | ○ |
| Exam. 7 | A | rammer | 40 | 2.60 | 50 | 2 | 10 | 0 | 14 | 176 | 123 | ○ |
| Exam. 8 | A | rammer | 40 | 2.59 | 100 | 2 | 10 | 0 | 14 | 175 | 121 | ○ |
| Exam. 9 | A | rammer | 40 | 2.46 | 200 | 2 | 10 | 0 | 18 | 170 | 110 | ○ |
| Exam. 10 | A | rammer | 40 | 2.54 | 100 | 50 | 10 | 1 | 15 | 172 | 105 | ○ |
| Exam. 11 | A | rammer | 40 | 2.54 | 100 | 100 | 10 | 1 | 15 | 172 | 106 | ○ |
| Exam. 12 | A | rammer | 40 | 2.54 | 100 | 2 | 1 | 3 | 14 | 171 | 53 | ○ |
| Exam. 13 | A | rammer | 40 | 2.54 | 100 | 2 | 5 | 1 | 15 | 172 | 120 | ○ |
| Exam. 14 | A | rammer | 40 | 2.54 | 100 | 2 | 20 | 0 | 16 | 173 | 121 | ○ |
| Exam. 15 | A | rammer | 40 | 2.54 | 100 | 2 | 30 | 0 | 16 | 173 | 131 | ○ |
| Exam. 16 | A | rammer | 40 | 2.54 | 100 | 100 | 1 | 3 | 14 | 171 | 57 | ○ |
| Exam. 17 | A | rammer | 40 | 2.54 | 100 | 100 | 5 | 1 | 15 | 172 | 102 | ○ |
| Exam. 18 | A | rammer | 40 | 2.54 | 100 | 100 | 20 | 0 | 16 | 173 | 110 | ○ |
| Exam. 19 | A | rammer | 40 | 2.54 | 100 | 100 | 30 | 0 | 16 | 173 | 115 | ○ |
| Exam. 20 | B3 | rammer | 40 | 2.53 | 20 | 2 | 10 | 0 | 16 | 173 | 131 | ○ |
| Exam. 21 | B3 | rammer | 40 | 2.51 | 50 | 2 | 10 | 0 | 16 | 172 | 126 | ○ |
| Exam. 22 | B3 | rammer | 40 | 2.48 | 100 | 2 | 10 | 0 | 17 | 171 | 114 | ○ |
| Exam. 23 | B3 | rammer | 40 | 2.44 | 200 | 2 | 10 | 0 | 18 | 169 | 113 | ○ |

Remarks: Exam. = Example

TABLE 2

| | Type of pug | Forming method | Mixing & forming Amount of mixing SiC >0.5 mm (% by mass) | Bulk density of formed body (g/cm³) | Thickness of formed body (mm) | Condition for firing from 1000° C. to 1400° C. Pressure (hPa) | Heating-up time (Hrs.) | Characteristics of fired body Apparent porosity (%) | Si content % by mass | Thermal conductivity (W/(m·k)) | Bending strength (MPa) | Crack after firing |
|---|---|---|---|---|---|---|---|---|---|---|---|---|
| Exam. 24 | B3 | vibrating press | 40 | 2.29 | 100 | 2 | 10 | 1 | 22 | 161 | 108 | ○ |
| Exam. 25 | B1 | rammer | 8 | 1.91 | 100 | 50 | 5 | 0 | 33 | 144 | 42 | ○ |
| Exam. 26 | B2 | rammer | 10 | 2.15 | 100 | 50 | 5 | 0 | 26 | 156 | 134 | ○ |
| Exam. 27 | B4 | rammer | 80 | 2.21 | 100 | 50 | 5 | 0 | 24 | 159 | 58 | ○ |
| Exam. 28 | B5 | rammer | 85 | 2.09 | 100 | 50 | 5 | 0 | 28 | 153 | 43 | ○ |
| Exam. 29 | C | rammer | 40 | 2.21 | 100 | 50 | 5 | 0 | 8 | 186 | 139 | ○ |
| Exam. 30 | D | casting | 40 | 2.45 | 100 | 50 | 5 | 1 | 18 | 168 | 108 | ○ |
| Com. Ex. 1 | B3 | rammer | 40 | 1.40 | 100 | 2 | 10 | 5 | 47 | 104 | ND | X |
| Com. Ex. 2 | C | rammer | 40 | 2.34 | 100 | 50 | 5 | 1 | 4 | 191 | ND | X |
| Com. Ex. 3 | E | rammer | 0 | 2.30 | 100 | 50 | 5 | 8 | 18 | 79 | ND | X |
| Com. Ex. 4 | E | rammer | 0 | 2.30 | 50 | 50 | 5 | 7 | 19 | 81 | ND | X |
| Com. Ex. 5 | E | rammer | 0 | 2.30 | 200 | 50 | 5 | 9 | 18 | 77 | ND | X |
| Com. Ex. 6 | E | rammer | 0 | 2.30 | 300 | 50 | 5 | 12 | 16 | 68 | ND | X |
| Com. Ex. 7 | E | rammer | 0 | 2.30 | 100 | 50 | 1 | 10 | 17 | 74 | ND | X |
| Com. Ex. 8 | E | vibrating press | 0 | 2.35 | 100 | 50 | 5 | 8 | 17 | 79 | ND | X |
| Com. Ex. 9 | E | oil hydraulic press | 0 | 2.21 | 100 | 2 | 5 | 10 | 20 | 75 | ND | X |
| Com. Ex. 10 | E | oil hydraulic press | 0 | 2.21 | 100 | 10 | 5 | 11 | 20 | 71 | ND | X |
| Com. Ex. 11 | E | oil hydraulic press | 0 | 2.21 | 100 | 50 | 5 | 12 | 19 | 67 | ND | X |
| Com. Ex. 12 | E | oil hydraulic press | 0 | 2.21 | 100 | 50 | 20 | 10 | 20 | 75 | ND | X |
| Com. Ex. 13 | E | oil hydraulic press | 0 | 2.21 | 100 | 50 | 1 | 14 | 18 | 63 | ND | X |
| Com. Ex. 14 | E | oil hydraulic press | 0 | 2.21 | 100 | 100 | 5 | 14 | 18 | 62 | ND | X |

TABLE 2-continued

| | | Mixing & forming | | | Condition for firing from 1000° C. to 1400° C. | | Characteristics of fired body | | | | |
|---|---|---|---|---|---|---|---|---|---|---|---|
| | Type of pug | Forming method | Amount of mixing SiC >0.5 mm (% by mass) | Bulk density of formed body (g/cm³) | Thickness of formed body (mm) | Pressure (hPa) | Heating-up time (Hrs.) | Apparent porosity (%) | Si content % by mass | Thermal conductivity (W/(m·k)) | Bending strength (MPa) | Crack after firing |
| Com. Ex. 15 | E | oil hydraulic press | 0 | 2.21 | 100 | 200 | 5 | 17 | 17 | 54 | ND | X |

Remarks: Exam. = Example,
Com. Ex. = Comparative Example:
ND = impossible to determine.
○: no formation of cracks was observed.
X: formation of crack was observed.

As is clear from Table 1 and Table 2, the Si—SiC based fired bodies of Examples 1 to 30 contain silicon carbide particles having particle diameters of 0.5 mm or more and the silicon contents are 5 to 40 percent by mass, so that the evaluation results of the bending strength and the crack after firing are good. Furthermore, it is clear from Examples 7 to 9 and Examples 20 to 23 that even when the forming thickness increases, the bending strength is maintained at good values with no cracks occurring after firing.

The silicon carbide based fired bodies of the present invention may be used not only as shelf boards for firing ceramics such as insulators, sanitary earthenware, tableware, trim, and pottery pipes, tiles, and the like, but also for furnace tubes for firing semiconductors, tubes for roller heat exchanger elements of roller hearth kilns, shelf boards for firing ceramic products, and the like. Fired body members such as rotary kiln lifters in a thick-walled shape are also required to have strength, heat resistance, abrasion resistance, corrosion resistance, and other such characteristics.

What is claimed is:

1. A Si—SiC based fired body comprising:
    a plurality of silicon carbide (SiC) particles serving as an aggregate; and
    silicon (Si) filled into gaps between the silicon carbide particles,
    wherein the maximum particle diameter of the silicon carbide particles is 0.5 mm or more,
    the content of silicon is 5 to 40 percent by mass, and
    the porosity is 0 to 5%, and
    wherein the Si—SiC based fired body has a thick-walled shape having a thickness of 20 to 200 mm.

2. The Si—SiC based fired body according to claim 1, wherein the content of the silicon carbide particles having particle diameters of 0.5 mm or more is 10 to 80 percent by mass in the entire silicon carbide particles.

3. The Si—SiC based fired body according to claim 1, wherein the Si—SiC based fired body has at least one anchor embedded therein, is used as a rotary kiln lifter disposed along an inner surface of a shell of a rotary kiln, and wherein said anchor has an anchor-fixing member extending therefrom and is fixed to the inner surface of the rotary kiln shell, whereby the rotary kiln lifter is fixed to the rotary kiln.

4. A method for manufacturing a Si—SiC based fired body, the method comprising the steps of:
    preparing a pug containing silicon carbide particles having a maximum particle diameter of 0.5 mm or more;
    forming the pug into a formed body;
    heating the formed body to 1,000° C. or higher in an inert gas atmosphere at a pressure of 100 hPa or less to obtain a primary fired body; and
    heating the primary fired body in contact with silicon to 1,400° C. or higher in an inert gas atmosphere to obtain a Si—SiC based fired body,
    wherein the Si—SiC based fired body has a thick-walled shape having a thickness of 20 to 200 mm.

5. The method for manufacturing a Si—SiC based fired body according to claim 4, wherein the step for obtaining the primary fired body is a step in which the formed body is heated in an inert gas atmosphere at a pressure of 100 hPa or less at 1,000° C. or higher for 2 to 30 hours.

6. The method for manufacturing a Si—SiC based fired body according to claim 4,
    wherein the step for obtaining the primary fired body is a step in which the formed body is heated to 1,000° C. or higher, and below 1,400° C. in the presence of silicon in an inert gas atmosphere at a pressure of 100 hPa or less; and
    the step for obtaining the Si—SiC based fired body is a step in which the temperature is raised continuously from the step for obtaining the primary fired body, and the primary fired body in contact with silicon is heated to 1,400° C. or higher in an inert gas atmosphere.

7. The method for manufacturing a Si—SiC based fired body according to claim 5,
    wherein the step for obtaining the primary fired body is a step in which the formed body is heated to 1,000° C. or higher, and below 1,400° C. in the presence of silicon in an inert gas atmosphere at a pressure of 100 hPa or less; and
    the step for obtaining the Si—SiC based fired body is a step in which the temperature is raised continuously from the step for obtaining the primary fired body, and the primary fired body in contact with silicon is heated to 1,400° C. or higher in an inert gas atmosphere.

8. The method for manufacturing a Si—SiC based fired body according to claim 4, wherein the bulk density of the formed body is 1.65 to 2.7 g/cm³.

* * * * *